US011838276B2

(12) United States Patent
Ludin et al.

(10) Patent No.: US 11,838,276 B2
(45) Date of Patent: *Dec. 5, 2023

(54) SYSTEMS AND METHODS FOR PROXYING ENCRYPTED TRAFFIC TO PROTECT ORIGIN SERVERS FROM INTERNET THREATS

(71) Applicant: Akamai Technologies, Inc., Cambridge, MA (US)

(72) Inventors: Stephen L. Ludin, Mill Valley, CA (US); Michael A. Bishop, Cincinnati, OH (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,353

(22) Filed: May 19, 2021

(65) Prior Publication Data
US 2022/0078165 A1   Mar. 10, 2022

Related U.S. Application Data

(63) Continuation of application No. 16/194,022, filed on Nov. 16, 2018, now Pat. No. 11,019,034.

(51) Int. Cl.
*H04L 29/00* (2006.01)
*H04L 9/40* (2022.01)

(52) U.S. Cl.
CPC ...... *H04L 63/0281* (2013.01); *H04L 63/0853* (2013.01); *H04L 63/20* (2013.01)

(58) Field of Classification Search
CPC ............. H04L 63/0281; H04L 63/0853; H04L 63/20; H04L 63/0807
See application file for complete search history.

(56) References Cited

U.S. PATENT DOCUMENTS

| 11,019,034 B2 | 5/2021 | Ludin |
| 2004/0093419 A1* | 5/2004 | Weihl ............... H04L 63/166 709/214 |

(Continued)

OTHER PUBLICATIONS

U.S. Appl. No. 16/194,022, filed Nov. 16, 2018, (issued as U.S. Pat. No. 11019034).

(Continued)

*Primary Examiner* — Ghazal B Shehni

(57) ABSTRACT

This document describes, among other things, systems and methods for more efficiently resuming a client-to-origin TLS session through a proxy layer that fronts the origin in order to provide network security services. At the time of an initial TLS handshake with an unknown client, for example, the proxy can perform a set of security checks. If the client passes the checks, the proxy can transmit a 'proxy token' upstream to the origin. The origin can incorporate this token into session state data which is passed back to and stored on the client, e.g., using a TLS session ticket extension field, pre-shared key extension field, or other field. On TLS session resumption, when the client sends the session state data, the proxy can recover its proxy token from the session state data, and upon successful validation, bypass security checks that it would otherwise perform against the client, thereby more efficiently handling known clients.

12 Claims, 7 Drawing Sheets

(56) References Cited

U.S. PATENT DOCUMENTS

2015/0271285 A1* 9/2015 Hindawi ............... H04L 67/568
                                                                    709/213
2016/0234298 A1* 8/2016 Takeda .................... H04L 63/06
2017/0019410 A1* 1/2017 Reilly ..................... G06F 21/31
2019/0190950 A1* 6/2019 Senecal ............... H04L 63/1483

OTHER PUBLICATIONS

Transmittal Letter titled Communication Under MPEP § 609.02, submitted with this SB/08 of May 19, 2021, 2 pages.

* cited by examiner

SYSTEMS AND METHODS FOR PROXYING ENCRYPTED TRAFFIC TO PROTECT ORIGIN SERVERS FROM INTERNET THREATS

BACKGROUND

Technical Field

This document relates generally to network security systems.

Brief Description of the Related Art

It is known in the art to deploy a set of proxy servers in front of an origin server to protect that origin server from public interact threats. Clients attempting to contact the origin are routed to the proxy servers, e.g, via DNS request routing or otherwise. The proxy servers may be deployed by a service provider and operated as a multi-tenant platform. For a given tenant (i.e., corresponding to a given origin server), the proxy layer can provide a layer of customized authentication/authorization checks, deep packet inspection, volumetric attack filtering, and/or data cleansing before forwarding 'good' traffic to to the origin. Examples of the kind of filtering that may be provided are described, without limitation, in U.S. Pat. No. 7,260,639 ("Method and system for protecting web sites from public internet threats") and U.S. Pat. No. 8,458,769 ("Cloud based firewall system and service"), the teachings of which are hereby incorporated by reference in their entireties. The set of proxies providing this service are referred to hereafter as the site protection layer, for convenience's sake.

When a client wants to establish a TLS-secured connection to an origin, there are two options for deploying a proxy in the middle that performs the aforementioned security checks. The proxy could terminate the TLS session with the client, and then establish a second TLS connection to origin. Alternatively, the proxy could pass through the TLS session without termination, i.e., the proxy is a non-terminating TLS proxy. This latter alternative offers enhanced security from the origin's point of view, and it is the focus of the teachings of this document. (It should be understood that the foregoing is discussing TLS termination, not necessarily TCP termination; the termination of the TCP layer is independent of the above, e.g., the non-terminating proxy can still terminate TCP connections.)

A proxy that does not terminate TLS still can perform at least some security checks. For example, the non-terminating TLS proxy can still perform security checks such as SYN flood detection, checks done during and/or to validate the TCP or MS handshake, client IP reputation, volumetric attack detection, or others that rely on IP/TCP layer information. If the client passes these checks, the proxy can forward the MS-encrypted packets to the origin, and thereafter proxy the session's TLS record layer messages between the client and origin.

Generally speaking, client-to-origin TLS sessions may end for various reasons, such as an explicit closure of the transport layer connection, or due to a timeout (idle connection). In some cases this might occur in a mobile environment as the client moves. If and when the client reconnects to the origin, a TLS session can be re-established, using state information of the prior session. Preferably, the TLS session is re-established in an expedited way by resuming the prior session. There are known techniques in the art for efficiently resuming a TLS session without having to repeat some of the overhead steps (in particular, key negotiation in the handshake) involved in initiating the TLS session. For example, when using TLS 1.2, an origin server can store session state information that enables fast session resumption in a TLS session ticket, described in IETF RFC 5077. When using TLS 1.3, an origin server can stored session state information in the identity field of the pre shared key extension as defined by IETF RFC 8446.

However, a non-terminating TLS proxy in the aforementioned site protection layer has no access to these session-resumption mechanisms, as they are opaque fields to any entity other than the origin server. Without a mechanism to recognize a returning client that has already passed security checks (such as the non terminating TLS proxy checks mentioned above, e.g., SYN flood detection, checks done during and/or to validate the TCP or TLS handshake, client IP reputation, volumetric attack detection, or others that rely on IP/TCP layer information), the proxy must repeat those checks every time, even for a returning client that is resuming a session, before proxying the packets onto to the origin. This is inefficient, slow, and prevents the site protection layer from scaling well.

It is an objective of the teachings hereof to increase the efficiency and speed with which an internet site protection layer, comprised of network non-terminating TLS proxies, can process traffic before proxying it to an origin server. The teachings hereof address these and other needs that will become apparent in view of the teachings hereof.

BRIEF SUMMARY

This document describes, among other things, systems and methods for more efficiently resuming a client-to-origin TLS session through a proxy layer that fronts the origin in order to provide network security services. At the time of an initial TLS handshake with an unknown client, for example, the proxy can perform a set of security checks. If the client passes the checks, the proxy can transmit a 'proxy token' upstream to the origin. The origin can incorporate this token into session state data which is passed back to and stored on the client, e.g., using a TLS session ticket extension field, pre-shared key extension field, or other field. Data other than the proxy token in the session state data is preferably opaque to the proxy. On TLS session resumption, when the client sends the session state data, the proxy can recover its proxy token from the session state data. Upon successful validation of the proxy token, the proxy can bypass security checks that it would otherwise perform against the client. Accordingly, the proxy can forward the TLS layer messages from the approved client to the origin for session resumption, thereby more efficiently handling known clients.

The foregoing is a brief description of non-limiting aspects of the invention. It is not intended as a comprehensive statement covering all aspects of the invention. The scope of coverage that is sought is defined by the appended claims, which are incorporated by reference into this section.

BRIEF DESCRIPTION OF THE DRAWINGS

The invention will be more fully understood from the following detailed description taken in conjunction with the accompanying drawings, in which.

DETAILED DESCRIPTION

Figure 1:
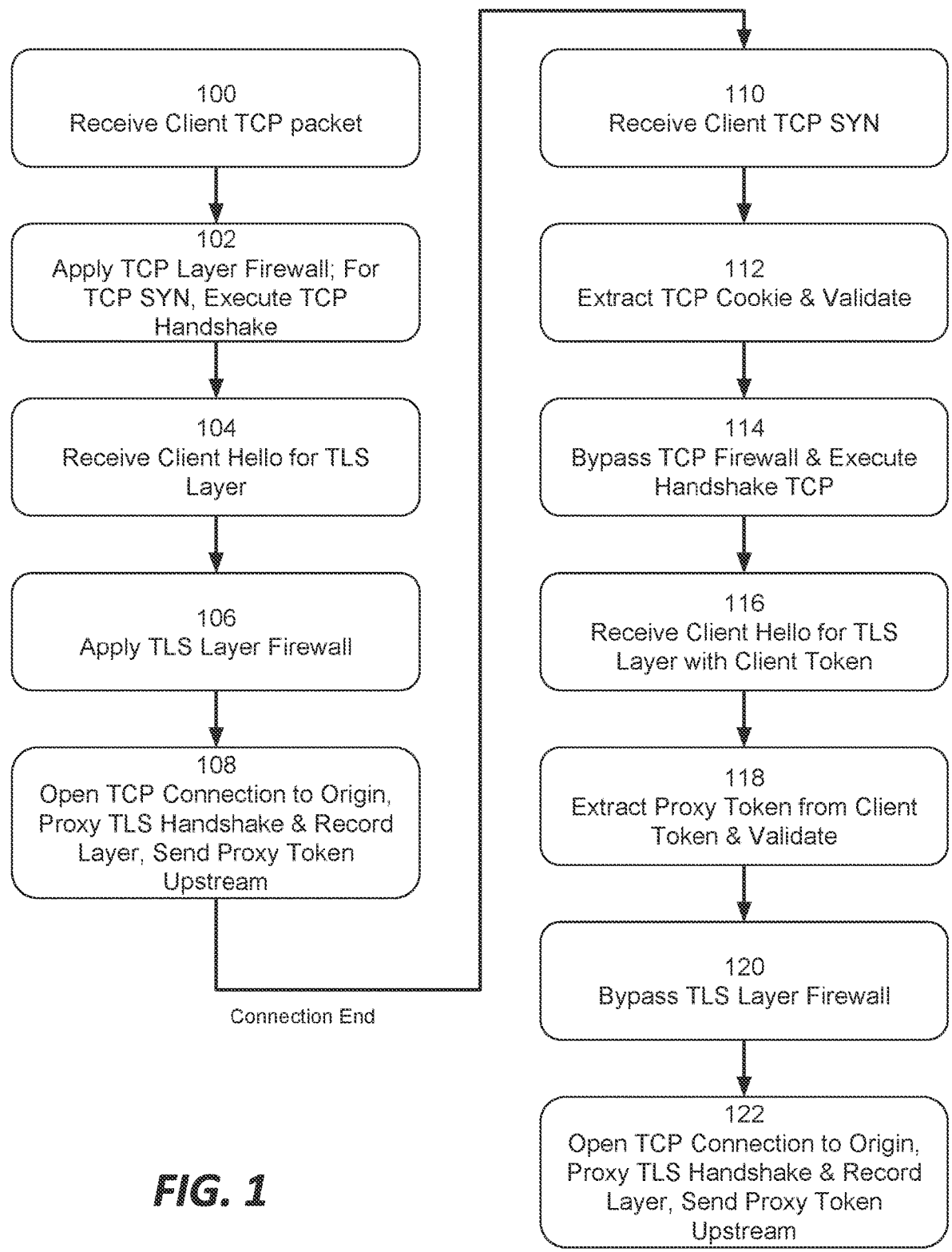
FIG. 1 is a sequence diagram illustrating a series of messages transmitted amongst a client, proxy, and origin server for TLS session initiation and resumption, in one embodiment.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain any such advantages and benefits in order to practice the teachings hereof.

Basic familiarity with well-known web page, streaming, and networking technologies and terms, such as HTML, URL, XML, AJAX, CSS, HTTP versions 1.1 and 2, DNS, HTTP over QUIC (HTTP/3), TCP, IP, TLS, and UDP, is assumed. The term "server" is used herein to refer to actual or virtualized hardware (a computer configured as a server, also referred to as an actual or virtualized "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented using any combination of hardware and software.

Introduction

In one embodiment, a platform comprising many distributed proxy servers, which may be deployed and operated by a content delivery network (CDN) or service provider, acts as a site protection layer for an origin server. The origin server hosts a website, web application, API service, or other service, all of which are collectively referred to herein as a 'digital property'. The digital property can be associated with a hostname. The published IP address for the digital property can be that of the proxy. This means that a DNS lookup to resolve the hostname of the digital property returns an answer with an address(es) of one or more proxy servers in the system. This is a known operation; more detail can be found in the CDN section at the end of this description.

Preferably, the proxy servers in the platform receive all traffic directed at the origin. The origin servers might be configured to discard incoming traffic not originating from the platform. The origin servers may be connected to the platform over the public Internet, or via private connection MPLS line, etc.). For more information, see U.S. Pat. No. 7,260,639 ("Method and system for protecting web sites from public internet threats"), the teachings of which are incorporated by reference herein.

Preferably, the proxy server will terminate the transport layer (TCP in this example), but not TLS. The proxy server provides two layers of security checks for the origin: a TCP layer firewall and a TLS layer firewall. Each may have it own set of security checks, configured as appropriate and customized for the target digital property. The exact nature and extent of the security checks is not crucial to the teachings hereof; any set of known security techniques can be used. The term 'firewall' is used here in a general sense to refer to a set of one or more security checks, not to a specific component. Some security checks may be generally applicable, in that the proxy applies them to all incoming connections. Other security checks may be custom or semi-custom, e.g., only applied to incoming traffic that is intended for a particular origin server or a subset of origin servers. (The intended origin can be determined based on (i) the IP address that the client is attempting to reach, assuming that IP addresses have been published in a way that they uniquely correlate to a particular digital property and/or particular origin server hosting said digital property, or alternatively (ii), once TCP has been accepted, the proxy can check the SNI extension in the TLS ClientHello for the origin hostname.)

In general, the proxy can apply a firewall at various layers in the network stack, including in particular at the TCP, TLS and application layers. The teachings hereof are focused on non-terminating TLS; hence, the TCP and TLS are available to the proxy and the application of the firewall at those layers is referred to herein as TCP Firewall and TLS Firewall respectively. The TCP level checks may be performed in a contiguous series, or at various times. The same is true of the TLS layer checks. The TCP and TLS firewalls are logically distinct but may be implemented by the same component. Moreover, some security checks by their nature must be implemented as part of a TCP firewall (e.g., TCP handshake); some are particular to TLS; while many may be performed as part of either or both.

Examples of security checks that the proxy may perform at the TCP and/or TLS layers include:
    Detection of volumetric attacks, including the teachings of U.S. Pat. No. 7,478,429, the teachings of which are hereby incorporated by reference
    Detection of TLS spoofing Detection of TLS, TCP, IP, or other protocol violations TCP or TLS handshake challenges TCP SYN flood detection IP reputation, e.g., based on client IP address Proof of IP address ownership Other checks that rely on IP/TCP layer information If and when a client passes the TCP and TLS security checks, the proxy server will pass messages from the client to the origin, preferably using a second TCP connection for that purpose, and thereafter the proxy server will proxy communications between the client and origin, in a split TCP fashion, as known in the art.

Some clients may be clients returning to the origin to resume a previously established session. Preferably, various mechanisms are used to enable clients to provide a proof that they have previously interacted with the desired digital property. Clients that present such proof are able to reach the origin in an expedited manner, bypassing at least some of the security checks, while clients who cannot present such proof are subject to the security checks, as they are 'unknown' and thus 'untrusted'.

FIG. 1 provides a high level overview of the logical operation of the proxy server, in one embodiment. Note that at each stage shown in FIG. 1 the diagram assumes that the prior stage completes successfully to move to the next stage (e.g. no threats are found, the client has the cookie or token that is required). If a stage fails (because for example an attack is detected), then the proxy would take a mitigating action, such as blocking the communication, dropping the connection, and/or generating an alert. This failure and mitigation path is not shown at each stage in order to avoid excessively cluttering the diagram.

At 100, the proxy server receives a TCP packet from a client. At 102, the proxy server applies a TCP layer firewall. The proxy server accepts TCP packets that belong to an existing, active session. The data in those packets is forwarded to the TLS layer. Packets that do not belong to an existing session and are not TCP SYN packets are dropped. In some implementations, this check might also form the basis of a reject rule programmed into the network interface card of the proxy server hardware, to suppress future packets of a similar pattern from arriving at the machine. For example, the proxy server may implement logic in hardware (and/or software) to detect and reject SYN flood attacks.

A valid TCP SYN packet indicates that a client desires to establish a new TCP connection. Assume that a client passes TCP checks (TCP firewall). Finishing step 102, a TCP handshake is performed and a TCP connection is established. If the client successfully completes the three-way TCP handshake and advertised support, the proxy server can store a TCP fast open cookie (as known in the art, see IETF RFC 7413) on the client for future use. The connection is passed to the TLS layer.

At 104, the client initiates a TLS handshake by sending a ClientHello, per the TLS protocol. The proxy server applies a TLS firewall at 106. This may comprise any number of security checks, such as those mentioned above. In some cases, the proxy server may send the IP address of the client to a separate threat intelligence system to assess the risk represented by the client.

Assume that the client passes the checks in the TLS firewall. At 108, the proxy server opens a separate TCP connection to the origin and sends the TLS handshake messages to the origin, so that the origin can complete the TLS handshake and establish a secure channel directly with the client. Also, at this time, the proxy server sends upstream to the origin server a set of data, referred to herein as a proxy token. (Exemplary methods for sending the proxy token are described later in this document.) The proxy token contains information enabling the proxy to recognize the client if and when the client returns to resume a session. The origin server will incorporate this information into a client token that it will store on the client. The origin can use known TLS mechanisms to store the client token on the client. For example, the client token can be stored in a TLS session ticket extension field (defined in RFC 5077, TLS v1.2 and earlier) or a TLS identity field of the pre-shared-key extension (defined in RFC 8446, TLS v1.3).

Assume that, between steps 108 and 110, the TCP connection between the client and proxy server and the TLS session ends for some reason. The TCP connection may be closed explicitly by the proxy server or client; the TCP connection may timeout. At step 110, the same client attempts to reconnect, again sending a TCP SYN.

At 112, the proxy server examines the TCP SYN and extracts the TCP fast open cookie. If the client presents a valid TCP fast open cookie for its IP address (i.e., in some implementations "valid" can mean that the client is using the same IP address as before; in other implementations, it can mean that the client IP address has changed but remains within the same geolocation and ISP), the proxy server immediately accepts the client and passes the connection to the TLS layer. This is indicated at step 114, where the client bypasses the TCP firewall. In some cases, the proxy server may bypass only some aspects of the TCP firewall, but not others. Moreover, this bypass function may be disabled in some embodiments. For example, under load, such as when an attack is ongoing, TCP fast open could be disabled. The number of simultaneous connections using the same TCP fast open cookie can also be tracked as a possible attack indicator.

At 116, the proxy server receives a ClientHello for the TLS layer, and the proxy server checks the message for the presence of a proxy token in one of the fields mentioned earlier: a TLS session ticket extension field (defined in RFC 5077, TLS v1.2 and earlier) or a TLS identity field of the pre-shared-key extension (defined in RFC 8446, TLS v1.3). According to the teachings hereof, the proxy server is not able to read the entire client token (which is encrypted and readable only by the origin). However, the proxy server does know where to locate and how to extract its proxy token. At 118, the proxy server extracts and validates the proxy token.

If the proxy token is present and valid, the proxy server forwards traffic to the origin, bypassing one or more security checks of the TLS firewall (see 120, 122 in FIG. 1).

If the proxy token is not present and valid, the client and/or connection will be subject to existing attack-detection logic as part of the TLS firewall, the result of which will determine whether the connection attempt is forwarded to the origin or rejected (similar to step 106). The number of simultaneous connections using the same token should also be tracked as a possible attack indicator, and a token rejected if it is being used too many times.

Step 122 mentions that the proxy server sends a new proxy token upstream to the origin server. This is done so that the origin can store a new (updated) client token on the client, using the same mechanism as before, in case the connection closes and needs to be resumed again.

Figure 2:
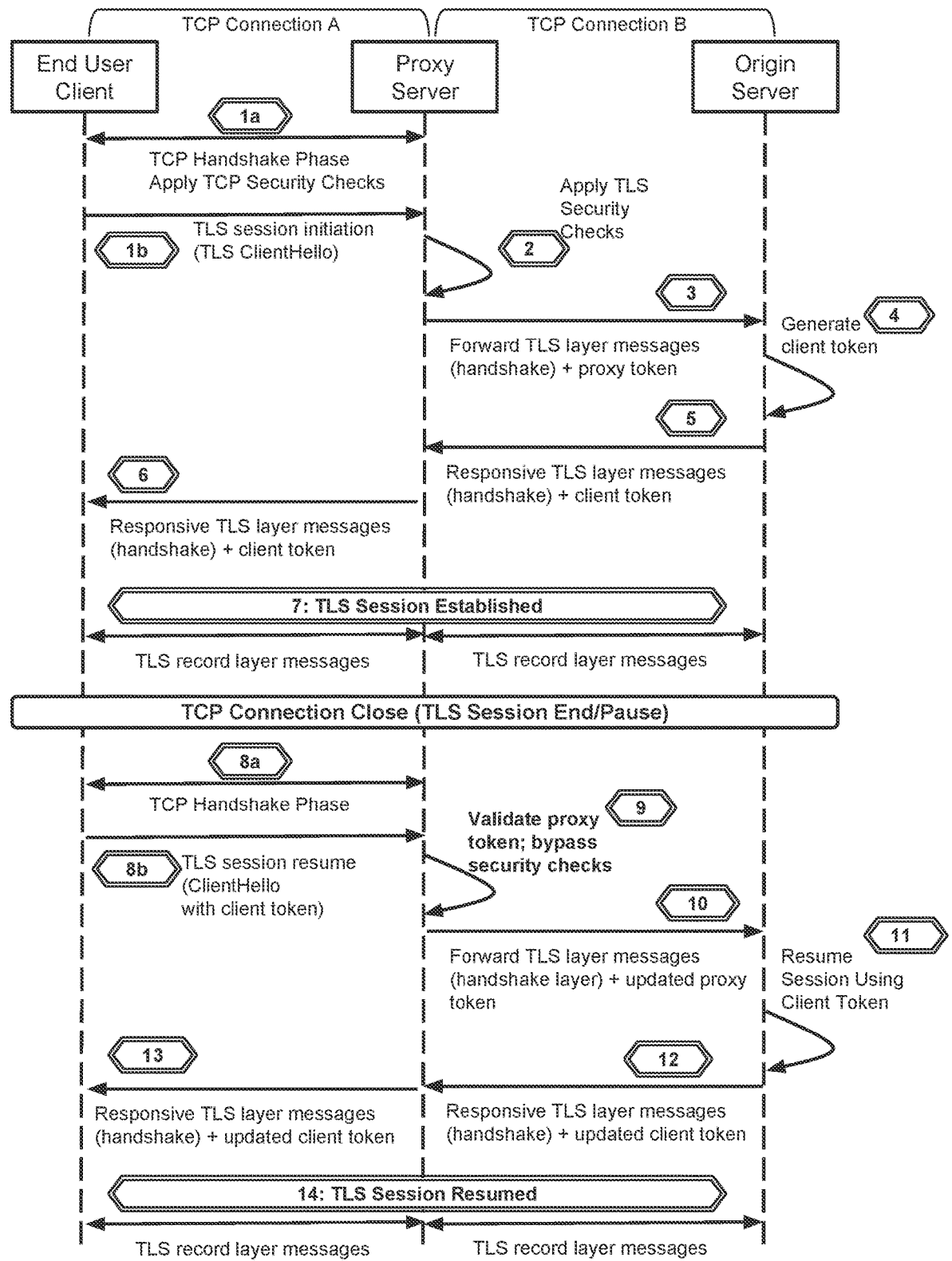
FIG. 2 is a flow diagram illustrating logic executed at the proxy in FIG. 1 and illustrating in more detail a TCP connection phase occurring prior to the TLS session initiation and/or resumption.

FIG. 2 is a sequence diagram illustrating the process just described with respect to FIG. 1, in terms of messages flowing amongst the client, proxy server and origin server.

Step <1a> corresponds to the phase involving the TCP connection establishment with the client, including the TCP handshake and the TCP firewall layer checks (which are not separately labeled, i.e., they are part of <1a>). Step <8a> then corresponds to the reopening of the TCP connection with the TCP fast open cookie. The rest of the diagram focuses on the TLS layer.

At step <1b>, assuming the TCP security checks have been passed, the end user client attempts to initiate a TLS session by sending TLS ClientHello message. The proxy can check this message to see if the client is sending a token, e.g., one that contains a proxy token. Assuming it does not, the proxy applies a variety of security checks at this stage, step <2>, which essentially corresponds to step 106 in FIG. 1. Note that multiple checks could be performed through the TLS handshake process the teachings hereof are not limited to performing checks only at the particular time of receipt of the the ClientHello.

If the client passes the security checks performed at TLS initiation, the proxy server can forward the TLS handshake messages to the origin server at <3>. At this time, the proxy server also sends the origin server the proxy token, which contains the data necessary for the proxy to recognize the client as having successfully passed the security checks. This corresponds to step 108 in FIG. 1.

The origin server incorporates the proxy token into other information (e.g., session state for the TLS session or other information generated by the origin server) and creates therefrom a client token at <4>. The origin server's responsive TLS handshake messages are proxied back to the client in <5> and <6>, with the result that a TLS session is established at <7>. Thereafter, the proxy server can proxy TLS record layer messages, which are opaque to the proxy, between the client and origin server.

As FIG. 2 indicates, assume that at some time later, the TLS session ends, e.g., because the TCP connection closes or otherwise. The session can be resumed as follows: at <8a>, the TCP phase takes place, including a TCP fast open if supported (step 110 to 114 of FIG. 1). At <9>, if the client provides the client token, and if the proxy server can successfully extract and validate its proxy token from that, then the proxy token can recognize the client as a returning client and skip TLS layer security checks, which corresponds to steps 118, 120 in FIG. 1. The proxy server forwards the TLS handshake messages along with a new (updated) proxy token. Thereafter the proxy server proxies the handshake messages, see <10, 11, 12, 13> of FIG. 2. At <13>, the origin server resumes the TLS session using the TLS session state information stored in the client token, or more specifically, using the data in the client token other than the proxy token data. Hence, shown at <14>, the TLS session is resumed, and TLS record layer messages can be proxied.

Figure 3:
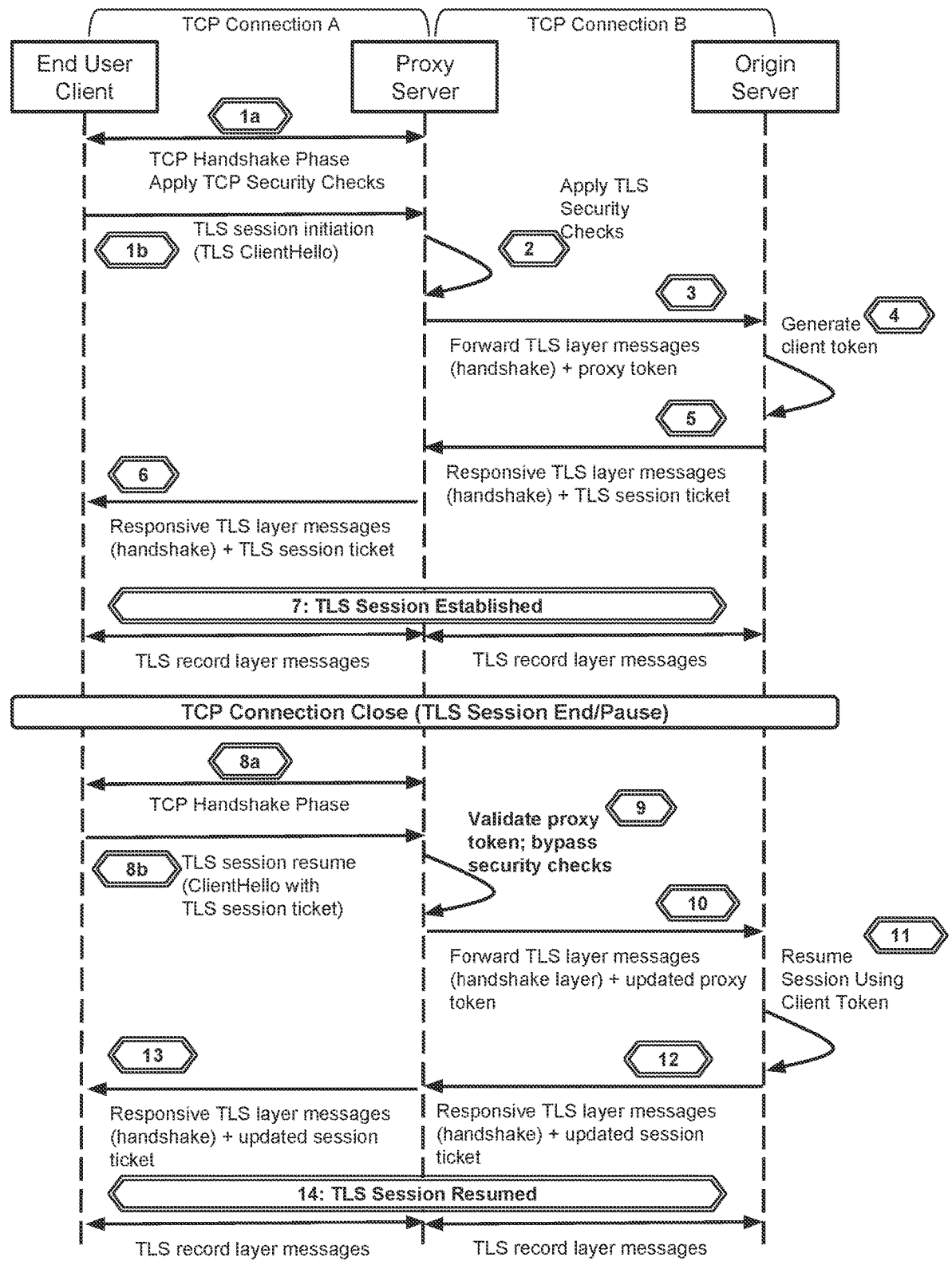
FIG. 3 is a sequence diagram adapting the series of messages shown in FIG. 1 to use a TLS session ticket technique, in one embodiment.

FIG. 3 is a sequence diagram that tracks FIG. 2 in large part but is more specific in that it shows how the TLS v.1.2 (and earlier) session ticket extension field mechanism can be used to hold the client token; therefore messages fields specific to that mechanism are shown.

Hence, at steps <5, 6> in FIG. 3, a TLS session ticket as specified in RFC 5077 is used to hold the client token data (which includes the proxy token). The TLS session ticket is generated by the origin and stored on the client. At <8b>, the client provides the TLS session ticket and the proxy server looks at the ticket to identify and extract its proxy token. At <12, 13> a new TLS session ticket can be stored on the client.

Figure 4:
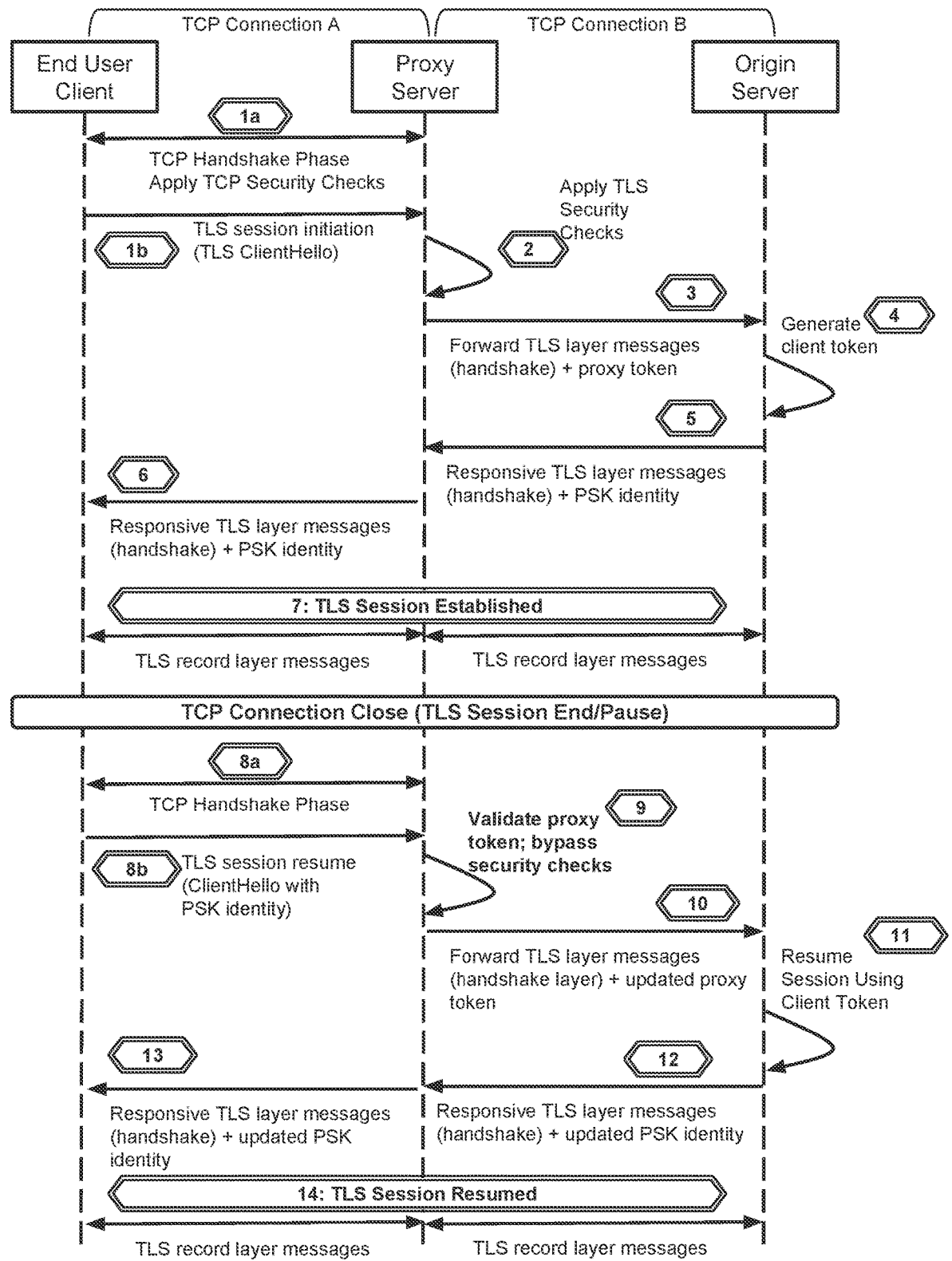
FIG. 4 is a sequence diagram adapting the series of messages shown in FIG. 1 to use a TLS identifier field and pre-shared-key technique, in one embodiment.

FIG. 4 is a sequence diagram that tracks FIG. 2 in large part, but assumes the the TLS v.1.3 identity field of the pre-shared-key extension mechanism (PSK identity) is used to hold the client token; therefore messages fields specific to that mechanism are shown.

Hence, at steps <5, 6> in FIG. 4, a PSK identity field per RFC 8446 is used to hold the client token data (which includes the proxy token). The PSK identity is generated by the origin and stored on the client. At <8b>, the client provides the PSK identity and the proxy server looks at it to identify and extract its proxy token. At <12, 13> a new PSK identity can be stored on the client.

Cookie & Token Construction

As described above, a TCP fast open cookie and a proxy token can be used demonstrate that a client has previously had a successful interaction with the proxy server (and potentially with the origin) from the current IP address. This enables repeat clients to experience expedited access to the origin server and permits the proxy server to focus attack mitigation resources on other traffic. Details about the construction of those data elements are now provided.

TCP Fast Open Cookies

TCP fast open cookies ("TFO cookies") can be handled internally by the proxy server using known techniques. A typical TFO cookie will consist of the previous IP address of the client, plus a random salt value, encrypted with a secret key known only by the proxy server and rotated periodically. This is a normal construction for TFO cookies. The cookie might also have a key generation identifier prepended. If the client's IP address is unchanged or is sufficiently similar (for example, within the same/24 range for IPv4, or within the/60 site prefix or containing the same interface identifier for IPv6), the cookie will be considered valid. The secret key may be unique per proxy server, shared across all proxy servers in the platform that are protecting an origin, or shared regionally. Sharing these keys regionally increases the frequency of successful client use, but also increases the key management complexity.

Session Tickets & Pre-Shared-Key (PSK) Identities

As explained in RFC 5077 and 8446, a TLS session ticket and/or a TLS pre-shared-key identity provides an arbitrary-length blob (binary large object) issued by a server to enable session resumption and state offloading via the client. The teachings hereof augment the session ticket or pre-shared-key identity with an attestation from the proxy server, which is referred to herein as a proxy token. The entire arbitrary length blob represents the "client token". The session ticket/pre-shared-key identity preferably uses a defined internal structure to hold the client token, a structure that is understood by both the proxy server and by the origin server being protected, so that the proxy server can extract the proxy token independently.

Figure 5:
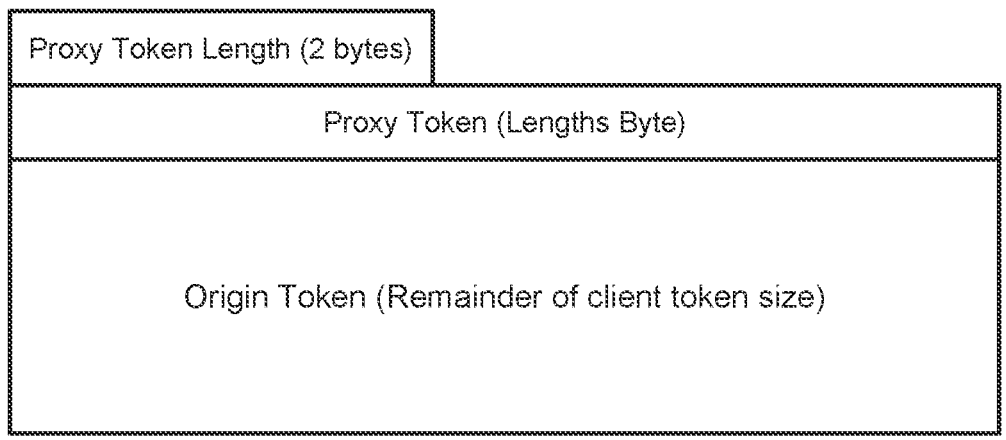
FIG. 5 is a diagram illustrating, in one embodiment, a format for a client token (with proxy token incorporated within) that can be stored in a TLS session ticket or TLS pre-shared-key identity field.

FIG. 5 provides one example of a defined structure for the client token, which can be stored in the TLS session ticket or the TLS pre-shared key identity field. In this embodiment, the client token has three parts. It begins a with a defined length field of 2 bytes that specifies the length of the proxy token. The proxy token is followed by data added by the origin, which is referred to as the 'origin token'. The origin token holds the TLS session state information needed for TLS session resumption by the origin. In other other embodiments, the proxy token could be placed elsewhere in the client token with a defined offset into the client token (e.g. a byte offset with a defined length).

In one embodiment, a proxy token can contain similar information to a TCP Fast Open cookie: the client's IP address and a random salt, encrypted with a secret key known only to Akamai. On incoming connections, the proxy server will locate and interpret the proxy token. If the client's IP is unchanged or sufficiently similar, the proxy token will be considered valid. New proxy tokens are issued to the origin server when a connection is relayed (that is, from the proxy's TCP connection with the client to the proxy's TCP connection with the origin), and the origin constructs session tickets using the proxy token and adding data (origin token).

As mentioned above, the origin token can be the same as, or substantially similar to, the blob that the origin server would store in a TLS session ticket and/or pre-shared-key identity if there were no proxy token.

Connections to Origin Servers

There are a variety of methods by which the data arriving over a client-to-proxy TCP connection could be forwarded to an origin server. Certain additional information may need to be added to the client's data, including for example:

Client's original IP address and port, for logging purposes
Client's trust status (verified or unknown)
The proxy token for use in a session ticket or pre-shared key identity issued by the origin server Two examples of methods of sending this information to origin are presented below.

Protocols for Sending Proxy Token to Origin

Embodiment Using HAProxy, version 2. The "proxy protocol" defined by HAProxy provides a known mechanism for a proxy server to pass information to an origin server which would have been available had the origin server received the original TCP connection. It is a one-way protocol, consisting of a single message which is prepended by the proxy before the client's bytes which are being relayed. The origin server consumes this information to inform its response to the client.

Version 2 of the HAProxy proxy protocol enables additional type-length-value fields to be supplied, including a reserved range for "custom" information. If both the proxy server and an origin support this protocol, a custom TLV can be defined to transport the trust status and the proxy server's proxy token.

Embodiment Using Extended CONNECT Method. The WebSockets service over HTTP/2 (described in RFC8441) defines an "extended CONNECT method" for HTTP/2. Whereas a traditional CONNECT in HTTP/2 asks an intermediary to open a TCP connection to a remote host and port, the extended CONNECT method asks the intermediary to use an HTTP/2 stream to carry an alternative protocol directed to the host. One defined alternative protocol for this scheme is TLS. This would permit a single TCP connection between a proxy server and an origin to carry many independent TLS connections which have been tunneled from various clients.

The CONNECT method is an HTTP request which can carry headers. The client's trust status, address information, and token can be included as HTTP headers on the CONNECT request. The client's own bytes follow, contained in DATA frames on the appropriate stream.

Client Challenge Mechanism Using HelloRetryRequest

TLS 1.3 provides a HelloRetryRequest mechanism that the proxy can use as a client challenge, in supplement to the teachings hereof. The use of this mechanism is entirely optional and provided here for completeness.

If used, the TLS HelloRetryRequest mechanism occurs around the time when the TLS firewall security checks are being applied to a new client. It involves the proxy server issuing a HelloRetryRequest to the client containing a newly issued cookie in the extension field. The client should respond with a ClientHello containing this cookie. If this is successful, the proxy server can then forward this new ClientHello to the origin.

The HelloRetryRequest is useful when the guarantees provided by a TCP handshake are unavailable, i.e., because TCP is not being used for the transport layer. In other words, if the teachings hereof are implemented in the context of a DTLS (datagram TLS) connection, for example, then HelloRetryRequest can be used to provide a proof of client IP address ownership.

Another use case for HelloRetryRequest is when the proxy server determines that the TLS settings of the client will not be suitable for the origin. In this case, before passing the TLS session messages onto the origin, the proxy server can force a change in the TLS settings (e.g., in the client's key share) using HelloRetryRequest.

The cookie contained in a HelloRetryRequest message and echoed back by a client in a second ClientHello is interpreted by both the proxy server and the origin server; to enable this, the proxy server and origin server can agree on a shared key between them. In addition to the client's IP address and random salt, the cookie contains a hash of the client's original ClientHello message, so that the origin can continue the TLS handshake successfully.

Teachings Not Limited to Specific Protocols

As those skilled in the art will recognize from the above, the teachings of this document are not limited to the use of TCP as the transport layer. Any transport layer protocol or protocol providing transport layer functions can be used to carry the TLS layer including DTLS, and more specifically, can be used to resume TLS/DTLS sessions using the client token with the hybrid proxy token/origin token information, as described herein.

In sum, for other embodiments, possible combinations of security layer and transport layer connection include: (i) TLS security layer and TCP connection, (ii) TLS security layer and QUIC connection, and (iii) DTLS security layer and UDP connection.

Content Delivery Networks

As the teachings hereof can be applied in the context of a CDN, a general overview of CDN components and operation is now provided. Specifically, the proxy server mentioned above can be a proxy server in a CDN platform, such as server 602 in FIG. 6, described in more detail below.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-mutable on the Internet, within or adjacent to nodes that are located in mobile networks, in or adjacent to enterprise-based private networks, or in any combination thereof.

Figure 6:
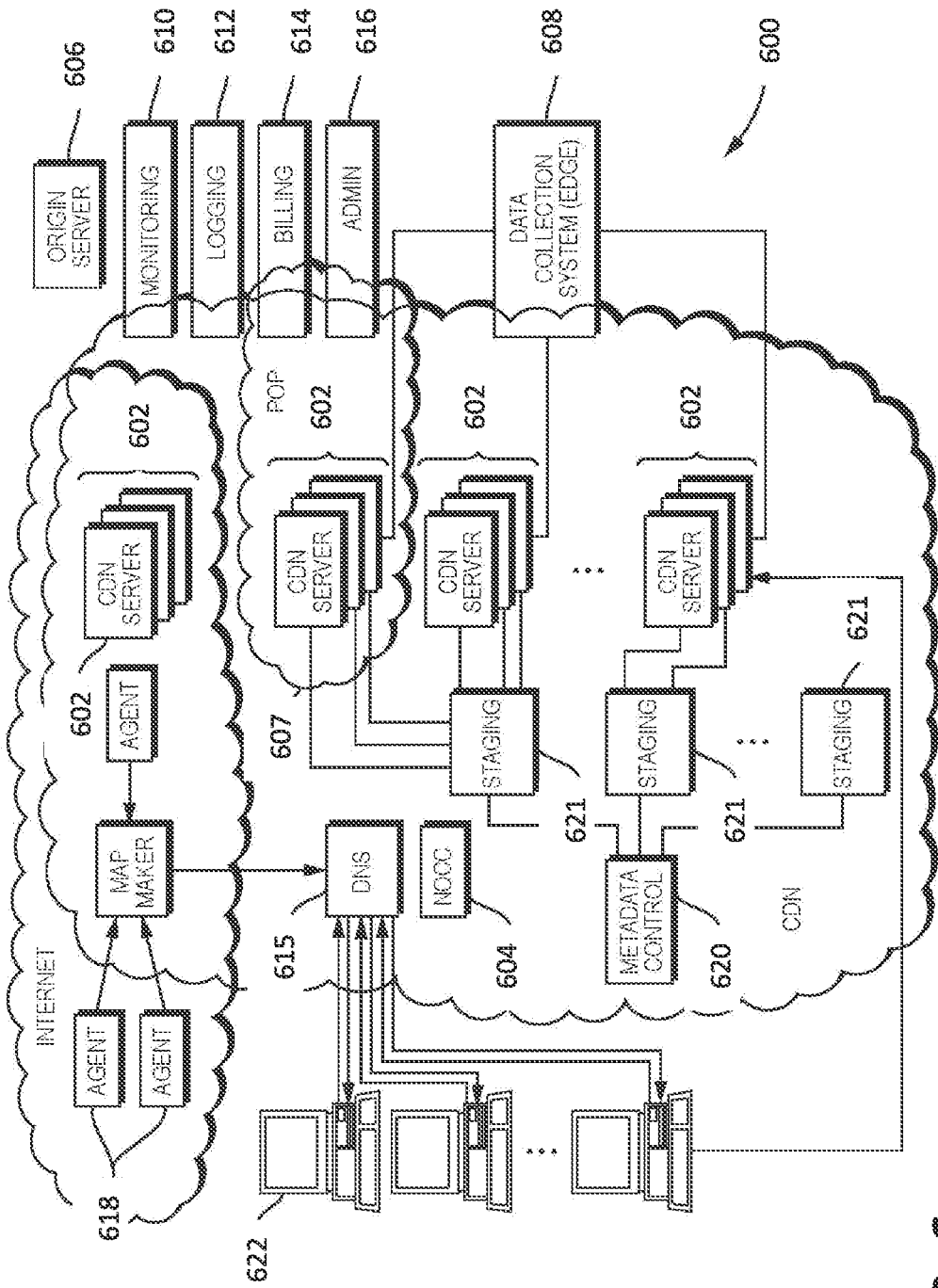
FIG. 6 is a diagram of a content deliver network, in one embodiment.

In a known system such as that shown in FIG. 6, a distributed computer system 600 is configured as a content delivery network (CDN) and is assumed to have a set of machines 602 distributed around the Internet. The machines 602 are servers can be reverse proxy servers and can be the proxy servers described earlier in the document.

A network operations command center (NOCC) 604 may be used to administer and manage operations of the various machines in the system. Third party sites affiliated with content providers, such as web site 606, offload delivery of content (e.g., HTML or other markup language files, embedded page objects, streaming media, software downloads, and the like) to the distributed computer system 600 and, in particular, to the servers 602 (which are sometimes referred to as content servers, or sometimes as "edge" servers in light of the possibility that they are near an "edge" of the Internet). Such servers may be grouped together into a point of presence (POP) 607.

Typically, content providers offload their content delivery by aliasing (e.g., by a DNS CNAME) given content provider domains or sub-domains to domains that are managed by the service provider's authoritative domain name service. End user client machines 622 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 6, the distributed computer system may also include other infrastructure, such as a distributed data collection system 608 that collects usage and other data from the CDN servers, aggregates that data across a region or set of regions, and passes that data to other back-end systems 610, 612, 614 and 616 to facilitate monitoring, logging, alerts, billing, management and other operational and administrative functions. Distributed network agents 618 monitor the network as well as the server loads and provide network, traffic and load data to a DNS query handling mechanism 615, which is authoritative for content domains being managed by the CDN. A distributed data transport mechanism 520 may be used to distribute control information (e.g., metadata to manage content, to facilitate load balancing, and the like) to the CDN servers.

A given server in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 602 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178 the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,558, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
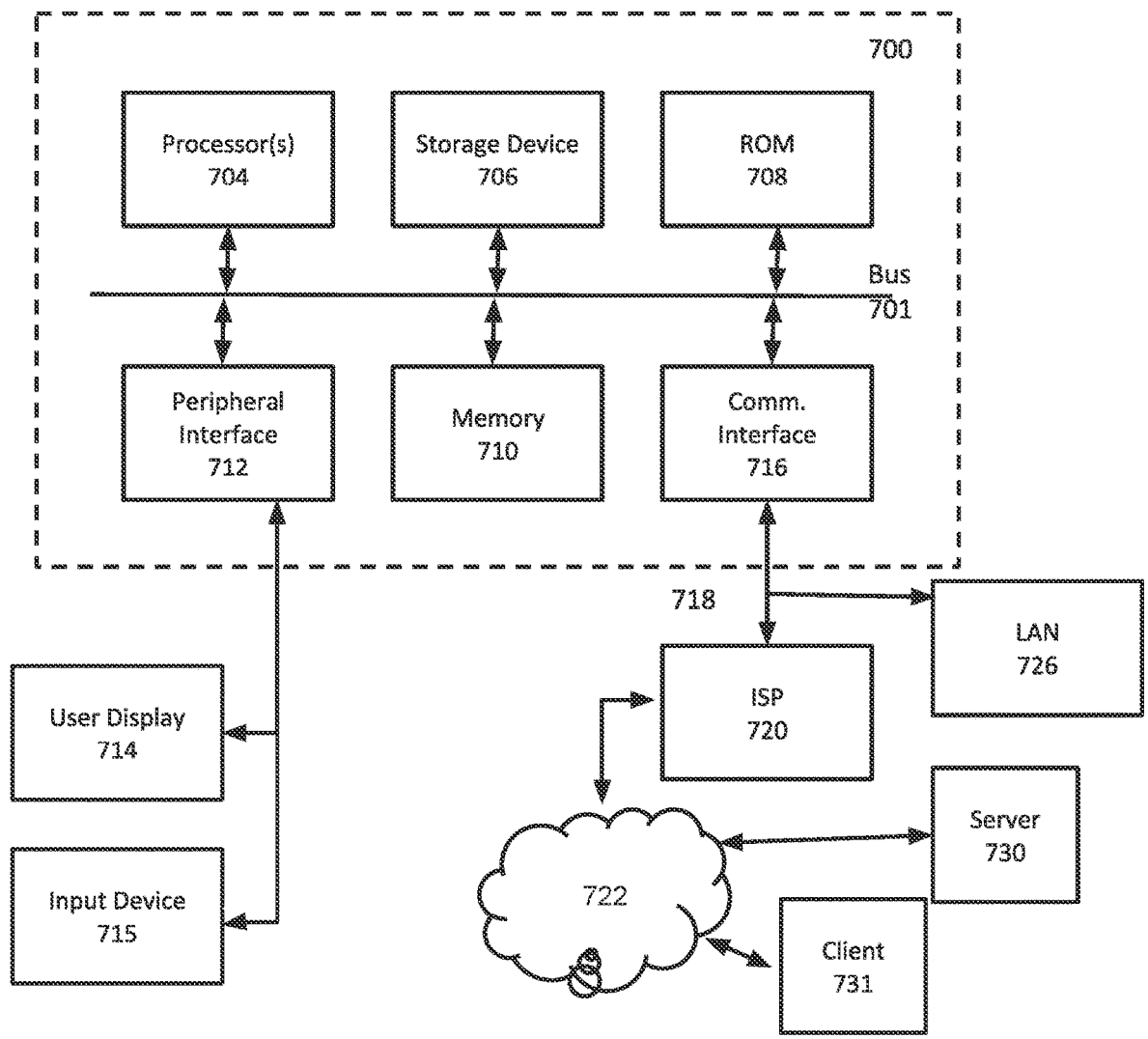
FIG. 7 is a block diagram illustrating hardware in a computer system that may be used to implement the teachings hereof.

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be Intel-processor based computers running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as RS-485, Universal Serial Bus (USB), IEEE 1394, or other communication links.

Computer system 700 is coupled to a communication interface 716 that provides a link (e.g., at a physical layer, data link layer) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method operable at a server, comprising:
receiving a first message from a client in order to establish a secure session between the client and the server;
when receiving the first message, receiving first data from at least one network security device that passed the first message from the client to the server;
generating a response to the first message;
wherein the response includes a data field holding second data generated by the server;
incorporating the first data into the data field in the response, wherein said incorporation comprises:
combining the first data and the second data to create combined data, such that the at least one network security device is able to extract the first data from a location in the combined data;
sending the response towards the client in order to establish the secure session;
closing the secure session;
receiving a second message from the client that seeks to resume the secure session, the second message being received from the at least one network security device after validation of the first data; and,
extracting the second data from the data field for use in resuming the secure session.

2. The method of claim 1, wherein the at least one network security device comprises a set of multiple network security devices.

3. The method of claim 2, wherein the first message is received via a first network security device, and the second message is received via a second network device.

4. The method of claim 1, wherein the location in the combined data is a predetermined location in the combined data.

5. A server comprising circuitry forming one or more processors and memory holding computer program instructions for execution on the one of more processors to operate the server to:
receive a first message from a client in order to establish a secure session between the client and the server;
when receiving the first message, receive first data from at least one network security device that passed the first message from the client to the server;
generate a response to the first message;
wherein the response includes a data field holding second data generated by the server;
incorporate the first data into the data field in the response, wherein said incorporation comprises:
combining the first data and the second data to create combined data, such that the at least one network security device is able to extract the first data from a location in the combined data;
send the response towards the client in order to establish the secure session;
close the secure session;
receive a second message from the client that seeks to resume the secure session, the second message being received from the at least one network security device after validation of the first data; and,
extract the second data from the data field for use in resuming the secure session.

6. The server of claim 5, wherein the at least one network security device comprises a set of multiple network security devices.

7. The server of claim 6, wherein the first message is received via a first network security device, and the second message is received via a second network device.

8. The server of claim 5, wherein the location in the combined data is a predetermined location in the combined data.

9. A non-transitory computer readable medium holding computer program instructions for operating a server, the computer readable instructions comprising instructions for:
receiving a first message from a client in order to establish a secure session between the client and the server;
when receiving the first message, receiving first data from at least one network security device that passed the first message from the client to the server;
generating a response to the first message;
wherein the response includes a data field holding second data generated by the server;
incorporating the first data into the data field in the response, wherein said incorporation comprises:
combining the first data and the second data to create combined data, such that the at least one network security device is able to extract the first data from a location in the combined data;
sending the response towards the client in order to establish the secure session;
closing the secure session;
receiving a second message from the client that seeks to resume the secure session, the second message being received from the at least one network security device after validation of the first data; and,
extracting the second data from the data field for use in resuming the secure session.

10. The non-transitory computer readable medium of claim 9, wherein the at least one network security device comprises a set of multiple network security devices.

11. The non-transitory computer readable medium of claim 10, wherein the first message is received via a first network security device, and the second message is received via a second network device.

12. The non-transitory computer readable medium of claim 10, wherein the location in the combined data is a predetermined location in the combined data.

* * * * *